(12) United States Patent
Kinzie

(10) Patent No.: US 9,494,134 B2
(45) Date of Patent: Nov. 15, 2016

(54) NOISE REDUCING EXTENSION PLATE FOR ROTOR BLADE IN WIND TURBINE

(71) Applicant: General Electric Company, Schenectady, NY (US)

(72) Inventor: Kevin Wayne Kinzie, Spartanburg, SC (US)

(73) Assignee: General Electric Company, Schenectady, NY (US)

( * ) Notice: Subject to any disclaimer, the term of this patent is extended or adjusted under 35 U.S.C. 154(b) by 510 days.

(21) Appl. No.: 14/085,047

(22) Filed: Nov. 20, 2013

(65) Prior Publication Data

US 2015/0139810 A1    May 21, 2015

(51) Int. Cl.
*F03D 1/06* (2006.01)

(52) U.S. Cl.
CPC ......... *F03D 1/0675* (2013.01); *F05B 2240/30* (2013.01); *Y02E 10/721* (2013.01); *Y10T 29/49336* (2015.01)

(58) Field of Classification Search
CPC ........ F03D 1/0675; F03D 1/065; F03D 1/06; F03D 1/0608; F05B 2240/30; Y02E 10/721; Y10T 29/49336
See application file for complete search history.

(56) References Cited

U.S. PATENT DOCUMENTS

| 175,355 A | 3/1876 | King |
|---|---|---|
| 573,562 A | 12/1896 | Wittram |
| 1,861,065 A | 5/1932 | Poot |
| RE19,412 E | 1/1935 | Stoner |
| 2,071,012 A | 2/1937 | Adams |
| 2,225,312 A | 12/1940 | Mason |
| 2,238,749 A | 4/1941 | Peltier |
| D131,271 S | 2/1942 | Colura |
| 2,312,219 A | 4/1943 | Sensenich |
| 2,469,167 A | 5/1949 | Little |
| 2,899,128 A | 8/1959 | Vaghi |

(Continued)

FOREIGN PATENT DOCUMENTS

| DE | 4440744 | 5/1996 |
|---|---|---|
| DE | 102006043462 | 3/2008 |

(Continued)

OTHER PUBLICATIONS

Risoe National Laboratory for Sustainable Energy, "Controllable Rubber Trailing Edge Flap May Ease Stress on Wind Turbine Blades", Renewable Energy World.com, pp. 1-3, Feb. 17, 2010.

(Continued)

*Primary Examiner* — Igor Kershteyn
*Assistant Examiner* — Eldon Brockman
(74) *Attorney, Agent, or Firm* — Dority & Manning, P.A.

(57) ABSTRACT

Rotor blade assemblies and methods for constructing rotor blade assemblies are provided. A rotor blade assembly may include a rotor blade having exterior surfaces defining a pressure side, a suction side, a leading edge and a trailing edge each extending between a tip and a root, the rotor blade defining a span and a chord. The rotor blade assembly further includes an extension plate mounted to one of the pressure side or the suction side, the extension plate extending in the chord-wise direction between a first end and a second end, the second end extending beyond the trailing edge. The rotor blade assembly further includes a filler substrate provided on an inner surface of the extension plate and the trailing edge, the filler substrate tapering from the trailing edge towards the second end.

19 Claims, 2 Drawing Sheets

(56) References Cited

U.S. PATENT DOCUMENTS

| | | | |
|---|---|---|---|
| 3,586,460 A * | 6/1971 | Toner | B64C 27/473 416/144 |
| 4,089,618 A | 5/1978 | Patel | |
| 4,188,171 A * | 2/1980 | Baskin | B64C 27/51 416/145 |
| 4,204,629 A | 5/1980 | Bridges | |
| 4,618,313 A | 10/1986 | Mosiewicz | |
| 4,720,244 A | 1/1988 | Kluppel et al. | |
| 4,962,826 A | 10/1990 | House | |
| 5,088,665 A | 2/1992 | Vijgen et al. | |
| 5,320,491 A | 6/1994 | Coleman et al. | |
| 5,328,329 A | 7/1994 | Monroe | |
| 5,522,266 A | 6/1996 | Nicholson et al. | |
| 5,533,865 A * | 7/1996 | Dassen | F03D 1/0608 244/200 |
| 5,819,357 A | 10/1998 | Gould | |
| 6,023,898 A | 2/2000 | Josey | |
| 6,352,601 B1 | 3/2002 | Ray | |
| 6,491,260 B2 | 12/2002 | Borchers et al. | |
| 6,729,846 B1 | 5/2004 | Wobben | |
| 6,733,240 B2 | 5/2004 | Gliebe | |
| 6,779,978 B2 | 8/2004 | Camargo Do Amarante | |
| 6,789,769 B2 | 9/2004 | Mau et al. | |
| 6,830,436 B2 | 12/2004 | Shibata et al. | |
| 7,059,833 B2 | 6/2006 | Stiesdal et al. | |
| 7,328,770 B2 | 2/2008 | Owens et al. | |
| 7,351,041 B2 | 4/2008 | Uselton et al. | |
| 7,413,408 B1 | 8/2008 | Tafoya | |
| 7,458,777 B2 | 12/2008 | Herr | |
| 7,632,068 B2 | 12/2009 | Bak et al. | |
| 7,637,721 B2 | 12/2009 | Driver et al. | |
| 7,740,206 B2 | 6/2010 | Eaton et al. | |
| 7,909,576 B1 * | 3/2011 | van der Bos | F03D 1/0675 416/146 R |
| 7,976,276 B2 | 7/2011 | Riddell et al. | |
| 7,976,283 B2 | 7/2011 | Huck | |
| 8,083,488 B2 * | 12/2011 | Fritz | F03D 1/0675 416/224 |
| 8,267,657 B2 | 9/2012 | Huck et al. | |
| 8,414,261 B2 | 4/2013 | Bonnet | |
| 8,430,638 B2 | 4/2013 | Drobietz et al. | |
| 8,506,250 B2 * | 8/2013 | Bagepalli | F03D 1/0675 29/889.71 |
| 8,523,515 B2 * | 9/2013 | Drobietz | F03D 1/0675 415/119 |
| 2001/0008032 A1 | 7/2001 | Llewellyn-Jones et al. | |
| 2003/0175121 A1 | 9/2003 | Shibata et al. | |
| 2004/0115060 A1 * | 6/2004 | Grabau | F01D 5/147 416/229 R |
| 2004/0219059 A1 | 11/2004 | Barringer et al. | |
| 2004/0253114 A1 | 12/2004 | Gunneskov et al. | |
| 2007/0025858 A1 | 2/2007 | Driver et al. | |
| 2007/0041823 A1 | 2/2007 | Miller | |
| 2007/0065290 A1 | 3/2007 | Herr | |
| 2007/0077150 A1 | 4/2007 | Llorente Gonzalez | |
| 2007/0125919 A1 | 6/2007 | Hopkins | |
| 2007/0294848 A1 | 12/2007 | Dumler | |
| 2008/0001363 A1 | 1/2008 | Bhate | |
| 2008/0061192 A1 | 3/2008 | Sullivan | |
| 2008/0080977 A1 | 4/2008 | Bonnet | |
| 2008/0107540 A1 | 5/2008 | Bonnet | |
| 2008/0166241 A1 | 7/2008 | Herr et al. | |
| 2008/0187442 A1 | 8/2008 | Standish et al. | |
| 2008/0298967 A1 | 12/2008 | Matesanz Gil et al. | |
| 2009/0016891 A1 | 1/2009 | Parsania et al. | |
| 2009/0074585 A1 | 3/2009 | Koegler et al. | |
| 2009/0087314 A1 | 4/2009 | Haag | |
| 2009/0097976 A1 | 4/2009 | Driver et al. | |
| 2009/0104038 A1 | 4/2009 | Grabau | |
| 2009/0126131 A1 | 5/2009 | Delaere et al. | |
| 2009/0169393 A1 | 7/2009 | Bagepalli et al. | |
| 2009/0274559 A1 | 11/2009 | Petsche et al. | |
| 2010/0028161 A1 | 2/2010 | Vronsky et al. | |
| 2010/0068042 A1 | 3/2010 | Brück et al. | |
| 2010/0101037 A1 | 4/2010 | Gross et al. | |
| 2010/0104436 A1 | 4/2010 | Herr et al. | |
| 2010/0127504 A1 | 5/2010 | Hancock | |
| 2010/0143151 A1 | 6/2010 | Kinzie et al. | |
| 2010/0266382 A1 | 10/2010 | Campe et al. | |
| 2010/0329879 A1 | 12/2010 | Presz, Jr. et al. | |
| 2011/0018282 A1 | 1/2011 | Hayashi et al. | |
| 2011/0042524 A1 | 2/2011 | Hemmelgarn et al. | |
| 2011/0142635 A1 * | 6/2011 | Fritz | F03D 1/0675 416/62 |
| 2011/0142637 A1 | 6/2011 | Riddell et al. | |
| 2011/0142666 A1 * | 6/2011 | Drobietz | F03D 1/0675 416/228 |
| 2011/0223030 A1 | 9/2011 | Huck et al. | |
| 2011/0268558 A1 | 11/2011 | Driver et al. | |
| 2012/0027590 A1 | 2/2012 | Bonnet | |
| 2012/0070281 A1 | 3/2012 | Fuglsang et al. | |
| 2012/0134817 A1 * | 5/2012 | Bagepalli | F03D 1/0675 416/62 |
| 2012/0141269 A1 | 6/2012 | Giguere et al. | |
| 2013/0164141 A1 * | 6/2013 | Lin | F03D 1/0641 416/223 R |
| 2013/0272892 A1 | 10/2013 | Liu | |
| 2013/0280085 A1 | 10/2013 | Koegler | |
| 2015/0118058 A1 * | 4/2015 | Vedula | F03D 1/0675 416/236 R |

FOREIGN PATENT DOCUMENTS

| | | |
|---|---|---|
| EP | 2138714 | 12/2009 |
| EP | 2270312 | 1/2011 |
| JP | 2000120524 | 4/2000 |
| JP | 2003254225 | 9/2003 |
| JP | 2008-115783 | 5/2008 |
| WO | WO 98/21091 | 5/1998 |
| WO | WO 2008/035149 | 3/2008 |
| WO | WO 2008/113349 | 9/2008 |
| WO | WO 2009/025549 | 2/2009 |

OTHER PUBLICATIONS

Risoe National Laboratory for Sustainable Energy, "Successful Wind Tunnel Test of Controllable Rubber Trailing Edge Flap for Wind Turbine Blades", Science Daily, pp. 1-2, Feb. 19, 2010.

Risoe National Laboratory for Sustainable Energy, The Technical University of Denmark, "Flexible Trailing Edge Flap for Blades to Make Wind Power Cheaper", Science Daily, pp. 1-2, Apr. 7, 2011.

Co-pending U.S. Appl. No. 13/644,130, filed Oct. 3, 2012.

* cited by examiner

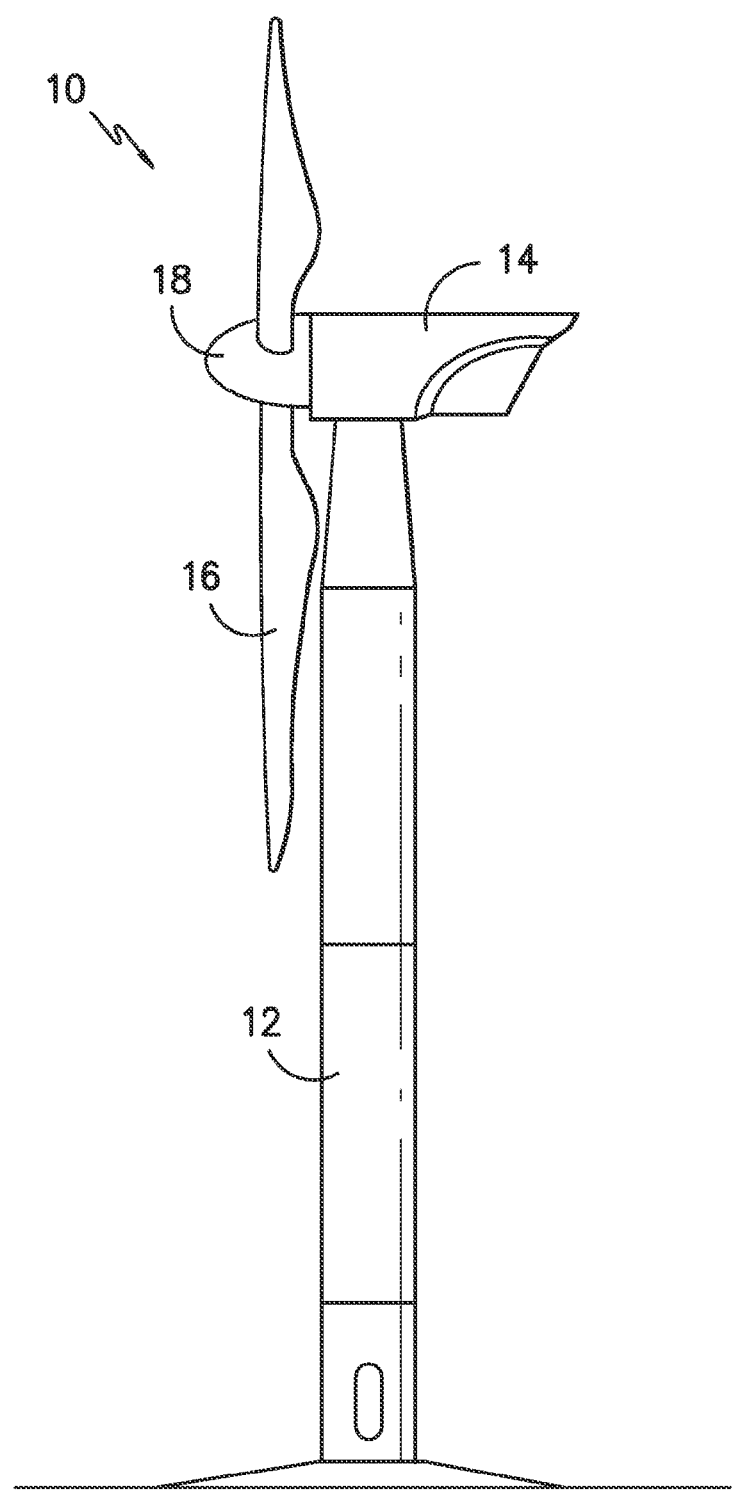
FIG. -1-
PRIOR ART

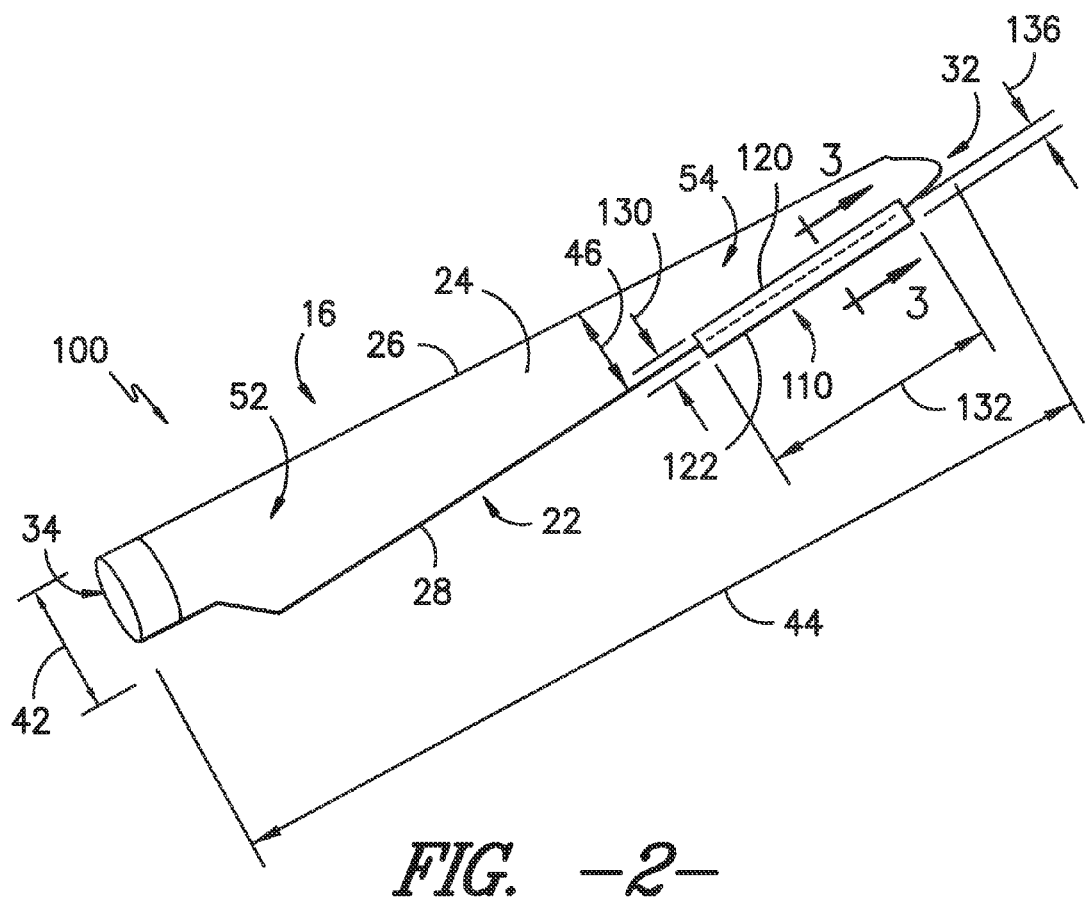
FIG. -2-
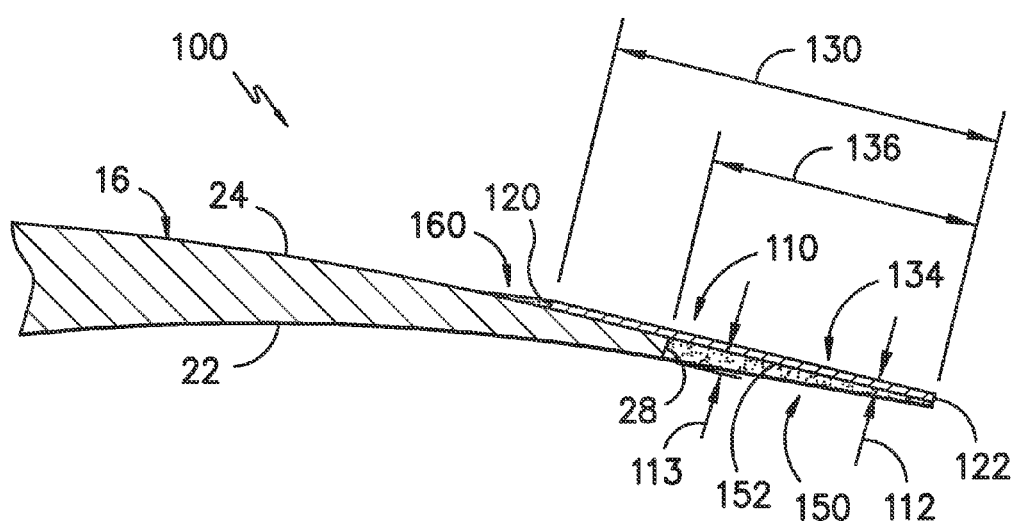
FIG. -3-

NOISE REDUCING EXTENSION PLATE FOR ROTOR BLADE IN WIND TURBINE

FIELD OF THE INVENTION

The present disclosure relates in general to wind turbine rotor blades, and more particularly to extension plates configured on the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, various components are attached to the rotor blades of wind turbines to perform various functions during operation of the wind turbines. These components may frequently be attached adjacent the trailing edges of the rotor blades. For example, noise reducers may be attached adjacent the trailing edges of the rotor blades to reduce the noise and increase the efficiency associated with the rotor blades. However, typical prior art noise reducers have a variety of disadvantages, and may not adequately reduce the noise associated with typical rotor blades. For example, many currently known noise reducers include a plurality of serrations. The serrations are designed to reduce noise when the wind flow over the noise reducer flows in a certain direction. If the direction of wind flow is altered, however, the effectiveness of the serrations in reducing the noise may be reduced.

Additionally, manufacturing limitations may limit the amount of noise reduction of which a rotor blade is capable. For example, a rotor blade is typically formed from a shell which includes various layers of material. Due to strength requirements for the rotor blade, the trailing edge of the rotor blade, such as of the shell forming the rotor blade, has minimum thickness limitations. Some rotor blades, for example, have trailing edges which are no less than 5 millimeters thick. Such minimum thickness limitations additionally limit further noise reduction efforts.

Accordingly, improved rotor blade assemblies would be desired in the art. For example, rotor blade assemblies which include improved noise reduction apparatus would be advantageous.

BRIEF DESCRIPTION OF THE INVENTION

Aspects and advantages of the invention will be set forth in part in the following description, or may be obvious from the description, or may be learned through practice of the invention.

In one embodiment, a rotor blade assembly is disclosed. The rotor blade assembly includes a rotor blade having exterior surfaces defining a pressure side, a suction side, a leading edge and a trailing edge each extending between a tip and a root, the rotor blade defining a span and a chord. The rotor blade assembly further includes an extension plate mounted to one of the pressure side or the suction side, the extension plate extending in the chord-wise direction between a first end and a second end, the second end extending beyond the trailing edge. The rotor blade assembly further includes a filler substrate provided on an inner surface of the extension plate and the trailing edge, the filler substrate tapering from the trailing edge towards the second end.

In another embodiment, a rotor blade assembly is disclosed. The rotor blade assembly includes a rotor blade having exterior surfaces defining a pressure side, a suction side, a leading edge and a trailing edge each extending between a tip and a root, the rotor blade defining a span and a chord. The rotor blade assembly further includes an extension plate mounted to one of the pressure side or the suction side, the extension plate extending in the chord-wise direction between a first end and a second end, the second end extending beyond the trailing edge. The extension plate has a thickness that is less than a thickness of the trailing edge.

In another embodiment, a method for constructing a rotor blade assembly is disclosed. The method includes mounting an extension plate to one of the pressure side or the suction side of a rotor blade, applying a filler substrate to the extension plate and the rotor blade, and forming the filler substrate such that the filler substrate tapers from a trailing edge of the rotor blade towards a second end of the extension plate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a wind turbine according to one embodiment of the present disclosure;

FIG. 2 is a top view of a rotor blade assembly according to one embodiment of the present disclosure; and FIG. 3 is a cross-sectional view of a rotor blade assembly according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade 16 according to the present disclosure is typically formed from a shell which may include exterior surfaces defining a pressure side 22 (see FIGS. 3 through 8) and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIG. 2, the chord 42 may vary throughout the span 44 of the rotor blade 16. Thus, a local chord 46 may be defined for the rotor blade 16 at any point on the rotor blade 16 along the span 44.

Additionally, the rotor blade 16 may define an inboard area 52 and an outboard area 54. The inboard area 52 may be a span-wise portion of the rotor blade 16 extending from the root 34. For example, the inboard area 52 may, in some embodiments, include approximately 33%, 40%, 50%, 60%, 67%, or any percentage or range of percentages therebetween, or any other suitable percentage or range of percentages, of the span 44 from the root 34. The outboard area 54 may be a span-wise portion of the rotor blade 16 extending from the tip 32, and may in some embodiments include the remaining portion of the rotor blade 16 between the inboard area 52 and the tip 32. Additionally or alternatively, the outboard area 54 may, in some embodiments, include approximately 33%, 40%, 50%, 60%, 67%, or any percentage or range of percentages therebetween, or any other suitable percentage or range of percentages, of the span 44 from the tip 32.

As illustrated in FIGS. 2 and 3, the present disclosure may further be directed to one or more rotor blade assemblies 100. A rotor blade assembly 100 according to the present disclosure includes a rotor blade 16 and one or more extension plates 110. In general, an extension plate 110 may be mounted to a surface of the rotor blade 16, such as in exemplary embodiments the suction side 24 or alternatively the pressure side 22. The extension plate 110 may advantageously have a thickness 112 that is less than a thickness 113 of the trailing edge 28 of the rotor blade 16. Thus, the extension plate 110 effectively extends a portion of the trailing edge 28 at locations to which the extension plate 110 is mounted, and reduces the thickness of the effective trailing edge at these locations. Such thickness may advantageously be reduced beyond those available for the rotor blade 16 itself due to the manufacturing limitations as discussed above. Reducing this thickness may advantageously reduce the aerodynamic noise being emitted from the rotor blade 16 during operation of the wind turbine 10 and/or increase the efficiency of the rotor blade 16.

As discussed, extension plate 110 in exemplary embodiments as shown in FIGS. 2 and 3 may be mounted to the suction side 24 of the rotor blade 16. Alternatively, extension plate 110 may be mounted to the pressure side 22. The extension plate 110 may be mounted directly to such surfaces via, for example, a suitable adhesive or suitable mechanical fasteners.

Extension plate 110 when mounted to a rotor blade 16 extends in the chord-wise direction between a first end 120 and a second end 122. The extension plate 110 may be mounted to the rotor blade 16 such that the second end 122 extends beyond the trailing edge 28. Further, the second end 122 when viewed from a top or bottom view such that shown in FIG. 2, may have a generally smooth, continuous profile, such that for example serrations are not formed by the extension plate 110. In some exemplary embodiments, for example, the extension plate 110 may be generally rectangular, as illustrated for example in FIG. 2.

As discussed, extension plate 110, and in particular the second end 122 thereof, may have a thickness 112 that is less than the thickness 113 of the rotor blade 16 trailing edge 28. For example, in some exemplary embodiments, thickness 112 may be less than 2 millimeters. In other exemplary embodiments, thickness 112 may be approximately 1 millimeter. Other suitable thicknesses less than the thickness 113 of the rotor blade 16 trailing edge 28 are within the scope and spirit of the present disclosure. Such minimal thicknesses advantageously provide increased noise reduction characteristics for the rotor blade assembly 100 relative to the characteristics of the rotor blade 16 (and larger trailing edge thickness 113) itself In exemplary embodiments, extension plate 110 may be formed from fiberglass or another suitable composite material. For example, to facilitate the minimal thickness 112 of the extension plate 110, a single ply of, for example, fiberglass may be utilized. Alternatively, however, other suitable materials, such as metals, may be utilized.

Extension plate 110 may further define a width 130 (in the chord-wise direction when mounted to rotor blade 16) and a length 132 (in the span-wise direction when mounted to rotor blade 16). Further, an extension portion 134 of the extension plate 110 may be defined as the portion that extends beyond the trailing edge 28 of the rotor blade, or in other words the portion between the second end 122 and the trailing edge 28. Extension portion 134 may define a width 136.

In some embodiments, width 136 of extension portion 134 is between approximately 5 times and approximately 20 times the thickness 113 of the trailing edge 28, such as between approximately 10 times and approximately 20 times the thickness 113. In other embodiments, width 136 is less than approximately 10 centimeters. In still other exemplary embodiments, width 136 is approximately 5 centimeters.

The overall width 130 may in some embodiments be less than or equal to approximately 20% of the chord 42 (such as the local chord 46 or average local chord 46 over the length of the 132 of the extension plate 110). In other embodiments, the overall width 130 may be between approximately 10% and approximately 20% of the chord 42 (such as the local chord 46 or average local chord 46 over the length of the 132 of the extension plate 110).

Extension plate 110 may further be mountable to the outboard portion 54 of the rotor blade, such that for example the entire extension plate 110 is within the outboard portion 54 in the span-wise direction. In some embodiments, for example, the length 132 of the extension plate 110 may be less than one-third of the span 44. In other embodiments, the length 132 of the extension plate 110 may be less than one-fourth of the span 44.

Such widths 130, 136 and 132 may advantageously facilitate the improved noise reduction characteristics of the extension plate 110 and rotor blade assembly 100 in general.

As illustrated in FIG. 3, a rotor blade assembly 100 according to the present disclosure may further include a filler substrate 150. The filler substrate 150 may be provided on the extension plate 110 and the trailing edge 28, and may provide a tapered transition between the trailing edge 28 and extension plate 110. For example, as illustrated, filler substrate 150 may be provided on an inner surface 152 of the extension plate 110, such as of the extension portion 134 of the extension plate 110. The filler substrate 150 may also be provided on the trailing edge 28, and may taper from the trailing edge 28 towards the second end 122. For example, filler substrate 150 may be provided on the rotor blade assembly 100, and then tapered (such as through use of a blade, squeegee, or other suitable tapering instrument) to a desired tapered profile. Filler substrate 150 may thus provide a transition between the trailing edge 28 and the second end 122.

Filler substrate 150 may be any suitable material. For example, in some embodiments, filler substrate 150 may be a bonding paste. Alternatively, filler substrate 150 may be a rubber or a silicone.

Use of a filler substrate 150 according to the present disclosure may advantageously facilitate the improved noise reduction characteristics of the extension plate 110 and rotor blade assembly 100 in general.

As illustrated in FIG. 3, a rotor blade assembly 100 according to the present disclosure may further include an auxiliary filler substrate 160. The auxiliary filler substrate 160 may be provided on the first end 120 of the extension plate 110 and the surface of the rotor blade 16 to which the extension plate is mounted, and may provide a tapered transition between the first end 120 and surface. For example, as illustrated, auxiliary filler substrate 160 may taper from the first end 120 towards the surface. Auxiliary filler substrate 160 may be provided on the rotor blade assembly 100, and then tapered (such as through use of a blade, squeegee, or other suitable tapering instrument) to a desired tapered profile. Auxiliary filler substrate 160 may thus provide a transition between the first end 120 and the surface.

Auxiliary filler substrate 160 may be any suitable material. For example, in some embodiments, auxiliary filler substrate 160 may be a bonding paste. Alternatively, auxiliary filler substrate 160 may be a rubber or a silicone.

Use of an auxiliary filler substrate 160 according to the present disclosure may advantageously facilitate the improved noise reduction characteristics of the extension plate 110 and rotor blade assembly 100 in general.

The present disclosure is further directed to methods for constructing rotor blade assemblies 100. A method may include, for example, mounting an extension plate 110 to one of the pressure side 22 or the suction side 24 of a rotor blade 16, as discussed herein. A method may further include, for example, applying a filler substrate 150 to the extension plate 110 and rotor blade 16, as discussed herein. A method may further include, for example, forming the filler substrate 150 such that the filler substrate 150 tapers from a trailing edge 28 of the rotor blade 16 towards a second end 122 of the extension plate 110, as discussed herein.

In some embodiments, a method according to the present disclosure may further include applying an auxiliary filler substrate 160 to the extension plate 110 and the rotor blade 16, as discussed herein. Such method may further include forming the auxiliary filler substrate 160 such that the auxiliary filler substrate 160 tapers from a first end 120 of the extension plate 110 towards the one of the pressure side 22 or the suction side 24 of the rotor blade 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly, comprising:
a rotor blade having exterior surfaces defining a pressure side, a suction side, a leading edge and a trailing edge each extending between a tip and a root, the rotor blade defining a span and a chord;
an extension plate mounted to one of the pressure side or the suction side, the extension plate extending in the chord-wise direction between a first end and a second end, the second end extending beyond the trailing edge; and,
a filler substrate provided on an inner surface of the extension plate and the trailing edge, the filler substrate tapering from the trailing edge towards the second end.

2. The rotor blade assembly of claim 1, wherein the extension plate has a thickness of less than 2 millimeters.

3. The rotor blade assembly of claim 1, wherein the extension plate has a thickness of approximately 1 millimeter.

4. The rotor blade assembly of claim 1, wherein an extension portion of the extension plate which extends beyond the trailing edge has a width in the chord-wise direction of between approximately 5 times and approximately 20 times a thickness of the trailing edge.

5. The rotor blade assembly of claim 1, wherein an extension portion of the extension plate which extends beyond the trailing edge has a width in the chord-wise direction of less than approximately 10 centimeters.

6. The rotor blade assembly of claim 1, wherein the extension plate has an overall width in the chord-wise direction of less than or equal to approximately 20 percent of the chord.

7. The rotor blade assembly of claim 1, wherein the extension plate is mounted. to the suction side.

8. The rotor blade assembly of claim 1, wherein the tiller substrate is one of a bonding paste, a rubber, or a silicone.

9. The rotor blade assembly of claim 1, further comprising an auxiliary filler substrate, the auxiliary filler substrate provided on the first end and the one of the pressure side or the suction side, the auxiliary filler substrate tapering from the first end towards the one of the pressure side or the suction side.

10. A rotor blade assembly, comprising:
   a rotor blade having exterior surfaces defining a pressure side, a suction side, a leading edge and a trailing edge each extending between a tip and a root, the rotor blade defining a span and a chord;
   an extension plate mounted to one of the pressure side or the suction side, the extension plate extending in the chord-wise direction between a first end and. a second end, the second end extending beyond the trailing edge, the extension plate having a thickness that is less than a thickness of the trailing edge; and
   an auxiliary filler substrate, the auxiliary filler substrate provided on the first end and the one of the pressure side or the suction side, the auxillary filler substrate tapering from the first end towards the one of the pressure side or the suction side.

11. The rotor blade assembly of claim 10, wherein the extension plate has a thickness of less than approximately 2 millimeters.

12. The rotor blade assembly of claim 10, wherein an extension portion of the extension plate which extends beyond the trailing edge has a width in the chord-wise direction of between approximately 5 times and approximately 20 times a thickness of the trailing edge.

13. The rotor blade assembly of claim 10, wherein an extension portion of the extension plate which extends beyond the trailing edge has a width in the chord-wise direction of less than approximately 10 centimeters.

14. The rotor blade assembly of claim 10, wherein the extension plate has an overall width in the chord-wise direction of less than or equal to approximately 20 percent of the chord.

15. The rotor blade assembly of claim 10, wherein the extension plate is mounted to the suction side.

16. The rotor blade assembly of claim 10, further comprising a filler substrate provided on an inner surface of the extension plate and the trailing edge, the filler substrate tapering from the trailing edge towards the second end.

17. The rotor blade assembly of claim 16, wherein the filler substrate is one of a bonding paste, a rubber, or a silicone.

18. A method for constructing a rotor blade assembly, the method comprising:
   mounting an extension plate to one of the pressure side or the suction side of a rotor blade;
   applying a filler substrate to the extension plate and the rotor blade; and
   forming the filler substrate such that the filler substrate tapers from a trailing edge of the rotor blade towards a second end of the extension plate.

19. The method of claim 18, further comprising:
   applying an auxiliary filler substrate to the extension plate and the rotor blade; and
   forming the auxiliary filler substrate such that the auxiliary filler substrate tapers from a first end of the extension plate towards the one of the pressure side or the suction side of the rotor blade.

* * * * *